US011608873B2

(12) United States Patent
Campbell

(10) Patent No.: US 11,608,873 B2
(45) Date of Patent: Mar. 21, 2023

(54) POTTING NECK ENHANCEMENT

(71) Applicant: Richard V. Campbell, Havana, FL (US)

(72) Inventor: Richard V. Campbell, Havana, FL (US)

( * ) Notice: Subject to any disclaimer, the term of this patent is extended or adjusted under 35 U.S.C. 154(b) by 94 days.

(21) Appl. No.: 17/216,945

(22) Filed: Mar. 30, 2021

(65) Prior Publication Data
US 2021/0215229 A1    Jul. 15, 2021

Related U.S. Application Data

(63) Continuation of application No. 16/119,064, filed on Aug. 31, 2018, now Pat. No. 10,962,088.

(60) Provisional application No. 62/669,414, filed on May 10, 2018.

(51) Int. Cl.
*F16G 11/04* (2006.01)
*D07B 1/14* (2006.01)
*D07B 9/00* (2006.01)

(52) U.S. Cl.
CPC ............... *F16G 11/04* (2013.01); *D07B 9/00* (2013.01)

(58) Field of Classification Search
CPC ......... F16G 11/04; F16G 11/042; D07B 1/14; D07B 9/00
See application file for complete search history.

(56) References Cited

U.S. PATENT DOCUMENTS

| | | | |
|---|---|---|---|
| 2004/0083607 A1* | 5/2004 | Campbell | B29C 66/131 29/857 |
| 2004/0101681 A1* | 5/2004 | Campbell | B29C 70/58 428/364 |
| 2005/0204555 A1* | 9/2005 | Campbell | F16G 11/042 29/874 |
| 2005/0208829 A1* | 9/2005 | Campbell | H01R 13/40 439/587 |
| 2006/0062525 A1* | 3/2006 | Campbell | F16G 11/042 385/53 |
| 2006/0096089 A1* | 5/2006 | Campbell | F16G 11/042 29/857 |
| 2007/0107927 A1* | 5/2007 | Campbell | H02G 15/068 174/73.1 |
| 2009/0189308 A1* | 7/2009 | Barefield | B29C 70/84 264/248 |

* cited by examiner

*Primary Examiner* — Robert Sandy
*Assistant Examiner* — Rowland Do
(74) *Attorney, Agent, or Firm* — J. Wiley Horton

(57) ABSTRACT

A cable termination in which part of the potted region is free to flex somewhat. A portion of the potted region is maintained within an anchor and rigidly held in the conventional fashion. Another portion, however, extends out of the anchor to ease the transition between the unpotted cable filaments and the filaments locked within the anchor.

20 Claims, 23 Drawing Sheets

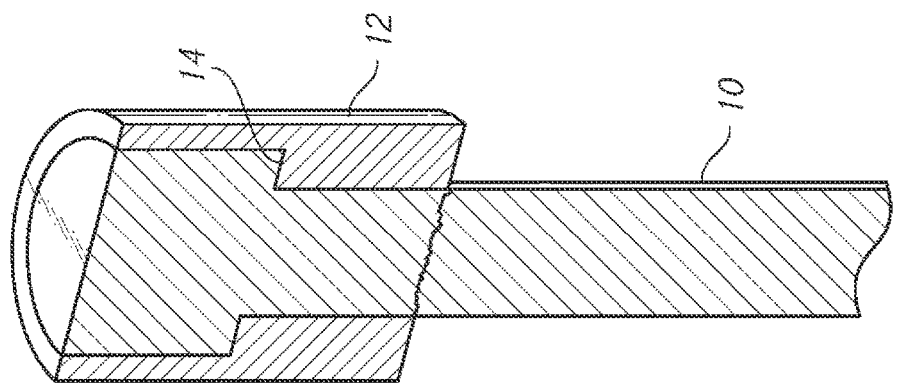
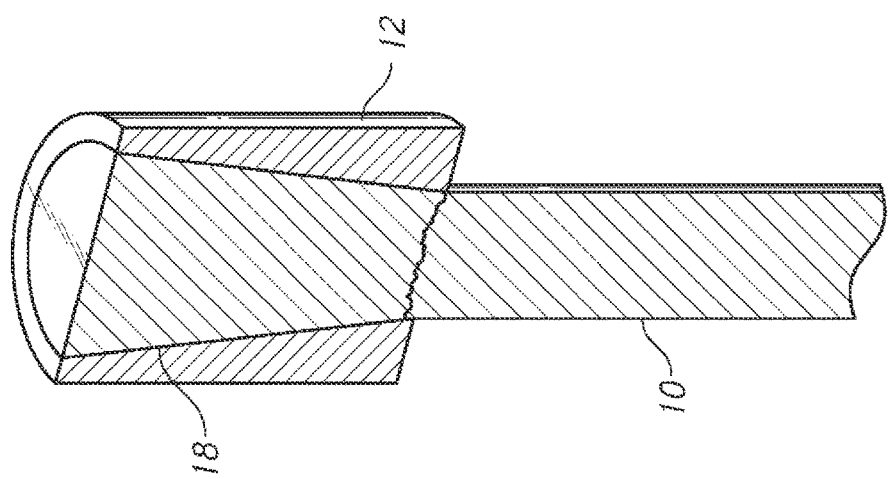
FIG. 1
(PRIOR ART)

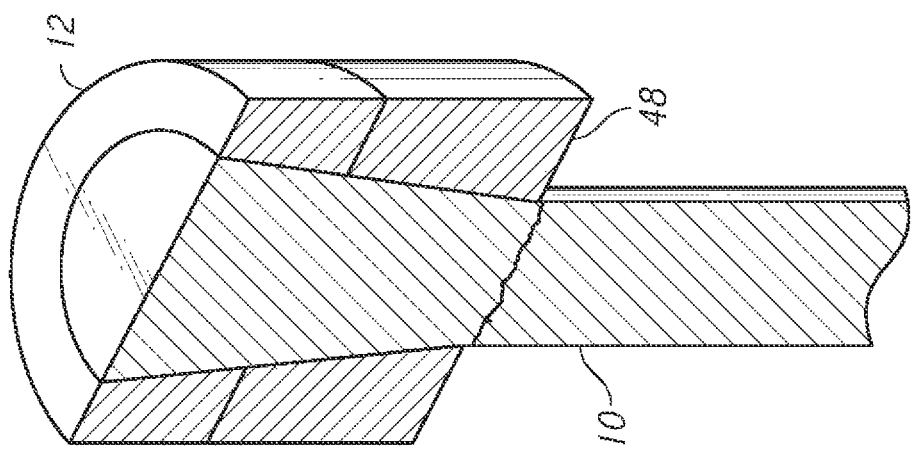

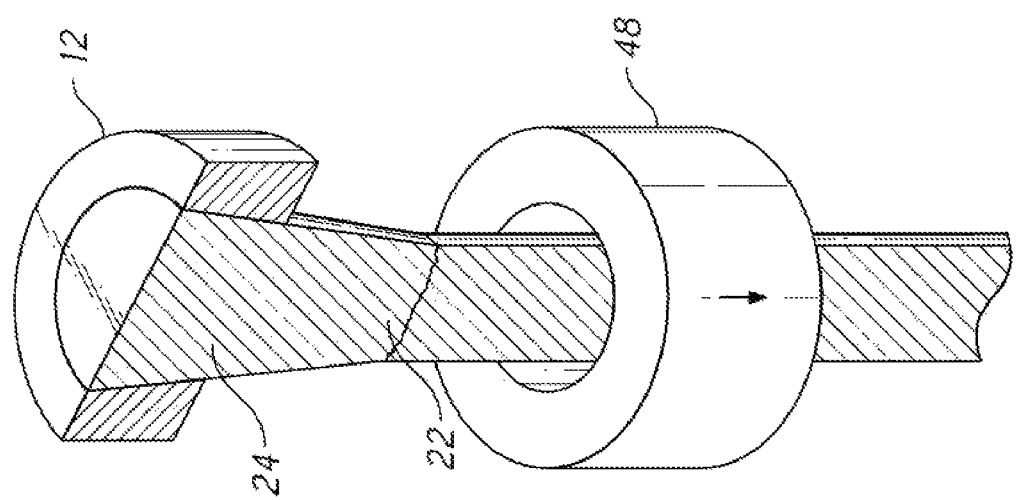

POTTING NECK ENHANCEMENT

CROSS-REFERENCES TO RELATED APPLICATIONS

This application is a continuation of U.S. patent application Ser. No. 16/119,064. The parent application was filed on Aug. 31, 2018. It listed the same inventor.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of tensile strength members. More specifically, the invention comprises an improved geometry for terminations used in tensile strength members, along with a series of devices used to create such geometry.

2. Description of the Related Art

Devices for mounting a termination on the end of a tensile strength member (such as a wire, rope, or cable) are disclosed in detail in commonly-owned U.S. Pat. Nos. 7,237,336; 8,048,357; 8,236,219 and 8,371,015. These prior patents are hereby incorporated by reference.

The present invention is particularly applicable to tensile strength members which incorporate advanced high-strength synthetic filaments. The term "filament" is used in this disclosure to describe the smallest constituent of a tensile strength member. These filaments typically have a very small cross section, analogous to that of human hair. The filaments are grouped together in different ways to make a particular known construction. As an example, a "twelve-strand cable" typically includes a braided construction of 12 individual strands. Each strand is a helically twisted cluster of many filaments. For such a construction the filament is the smallest element, the strand is an intermediate element, and the cable is the largest element. The reader should note that many cable constructions employ more than three levels of grouping.

The synthetic filaments themselves are made from many different materials. These include DYNEEMA (ultra-high-molecular-weight polyethylene), SPECTRA (ultra-high-molecular-weight polyethylene), TECHNORA (aramid), TWARON (p-phenylene terephthalamide), KEVLAR (para-aramid synthetic fiber). VECTRAN (a fiber spun from liquid-crystal polymer), PBO (poly(p-phenylene-2,6-benzobisoxazole)), carbon fiber, and glass fiber (among many others). The individual filaments are very strong in tension, but they are not very rigid. They also tend to have low surface friction. These facts make such synthetic filaments difficult to handle during the process of adding a termination and difficult to organize. The present invention is particularly applicable to terminations made of such high-strength filaments (either entirely of such filaments are including a substantial proportion of such filaments), for reasons which will be explained in the descriptive text to follow.

In the examples that follow the term "cable" will be used to describe a tensile strength member. Terminations are often added to an end of a cable via a potting process. Generally, the filaments proximate the end of a cable are wetted with a potting compound to affix them to a fitting. The term "potting compound" means any substance which transitions from a liquid to a solid over time. The most common example would be a cross-linking liquid such as an epoxy or a polyester resin. Those skilled in the art know that such formulations often use two separate liquids which cross-link when mixed together. Such a liquid is mixed just prior to wetting the filaments.

FIG. 1 shows a typical prior art termination. In the version shown in the left side of the view, anchor 12 incorporates expanding passage 18. Filaments of cable 10 are locked into expanding passage 18 using a potting compound such as epoxy, a thermoplastic, or any other material that changes from a liquid to a solid. One of two methods for forming a potted termination are in common use: (1) Pulling an anchor into its final position around the exposed cable filaments and pouring the potting compound into an open end of the anchor; and (2) Wetting the exposed cable filaments and subsequently pulling the anchor into position. When a tensile load is placed on cable 10, the load is transmitted to anchor 16 via the conical interface between the potted filaments and expanding passage 18.

An alternate configuration is shown in the right side of the view, in which the tensile load is transmitted via a step in interrupted passage 14. In either configuration, the transition between the potted and unpotted filaments within cable 10 is similar. The reader should note that the expanding cavity can include many different wall profiles, other than the linear taper shown. Exemplary profiles are described in commonly-owned U.S. Pat. Nos. 7,770,265 and 7,818,849—which are hereby incorporated by reference.

FIG. 2 shows the potted termination with the anchor removed so that the solidified potted region on the end of the cable can be observed. Potting compound 16 has been molded by expanding passage 18 into the shape shown. Filament transition 56 is the border between the regions of potted and unpotted filaments within cable 10. The potted region just above this point is denoted as throat 20. When the cable is loaded, throat 20 often sees the highest stress concentration. This is particularly true where the cable is flexed so that the axis of the cable is angularly misaligned with anchor 12. It is also true when the cable is loaded axially, since it represents the smallest cross sectional diameter within the potted region.

The term "filament" is conventionally used to describe the individual constituents of a synthetic cable. The term "strand" is conventionally used to describe the individual constituents of a wire rope. Throughout this disclosure, the term "filament" will be used for the individual constituent and the term "strand" will be used to refer to a grouping of filaments that is less than the whole cable. Although synthetic cables are used for the illustrations, the reader should understand that the devices disclosed are equally applicable to wire rope. The devices are also applicable to "hybrid" cables including both metallic and synthetic constituents.

BRIEF SUMMARY OF THE PRESENT INVENTION

The present invention comprises a cable termination in which part of the potted region is free to flex and elongate somewhat. A portion of the potted region is maintained within an anchor and substantially rigidly held. Another portion of the potted region, however, is free to flex somewhat to ease the transition between the unpotted cable filaments and the filaments locked within the anchor.

BRIEF DESCRIPTION OF THE SEVERAL VIEWS OF THE DRAWINGS

FIG. 1 is a sectional perspective view, showing two exemplary prior art cable terminations.

FIG. 14 is a sectional perspective view, showing an embodiment of the present invention.

FIG. 15 is a sectional perspective view, showing an embodiment of the present invention.

Figure 2:
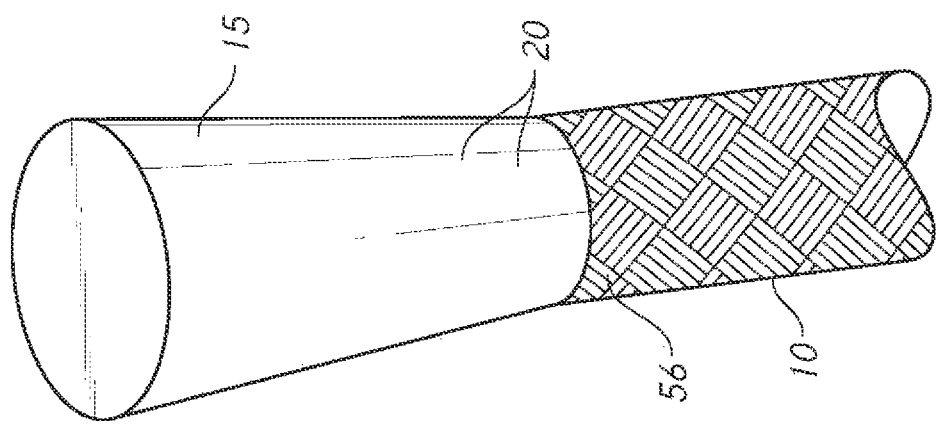
FIG. 2 is a perspective view, showing a volume of solidified potting compound that forms part of a prior art cable termination.

REFERENCE NUMERALS IN THE DRAWINGS 10 cable
12 anchor
14 interrupted passage
16 potting compound
18 expanding passage
20 throat
22 free portion
24 rigid portion
26 support flange
28 enlarged diameter
30 curved passage
32 fillet
34 straight component
36 expanding component
38 annular cavity
40 motion inhibitor
42 strain relief
44 pre-molded termination
46 free bore
48 molding supplement
50 removable material
52 soft collar
54 cable cushion
56 filament transition
58 cable
60 strand
62 strand
64 threaded engagement
68 strand
70 strand termination
74 stud
78 collector
80 loading eye
82 nut
84 multiple cavity anchor

DETAILED DESCRIPTION OF THE INVENTION

Figure 3:
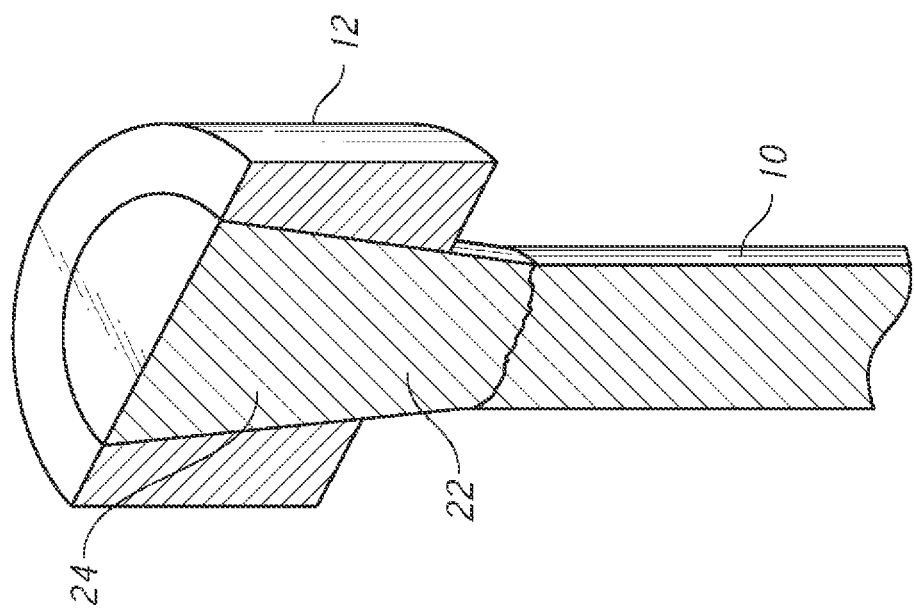
FIG. 3 is a sectional perspective view, showing an embodiment of the present invention.

FIG. 3 shows a cable termination made according to the present invention. Anchor 12 includes an expanding internal passage that is defined by a passage wall. The passage wall is preferably created by revolving a profile around a central axis that is parallel to the central axis of cable 10 (Note that the invention is not limited to revolved profiles and fanned or other shapes may be used for the internal passage).

A portion of the potted filaments in this example actually extend beyond the rigid anchor 12. As a result, the potted section of cable is divided into two sections—rigid portion 24 and free portion 22. Rigid portion 24 is constrained within the anchor and prevented from moving laterally by the surrounding passage wall. Free portion 22, however, is free to flex and elongate somewhat. The potting compound selected will vary this flexibility. By way of example, certain flexible epoxies (polyester, as well as other elastomers) are appropriate choices, as well as many thermoplastics. Free portion 22 is by no means as feely flexing as the unpotted filaments within the cable 10 outside the region of the termination. However, this region is "free" to elongate and move laterally to a greater extent than rigid portion 24 contained within the anchor. The existence of free portion 22 essentially creates an intermediate zone between the highly flexible unpotted filaments and rigid portion 24.

Figure 4:
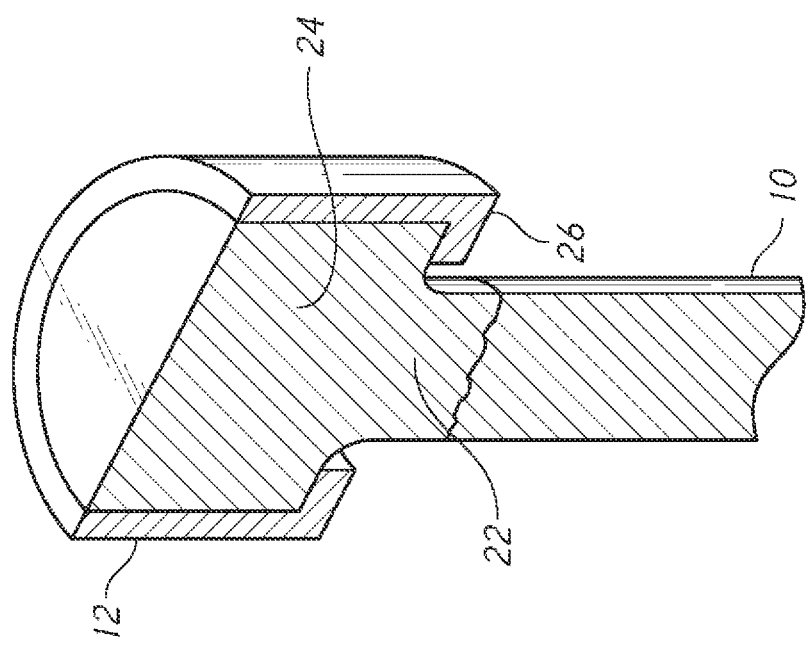
FIG. 4 is a sectional perspective view, showing an embodiment of the present invention.
Figure 5:
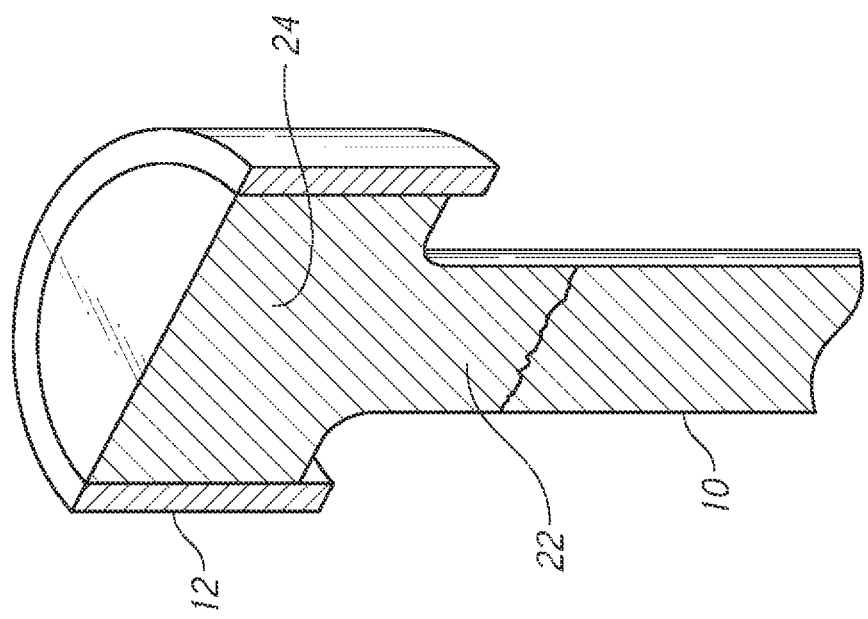
FIG. 5 is a sectional perspective view, showing an embodiment of the present invention.

Free portion 22 can be added to many types of cable terminations. FIG. 4 shows an anchor 12 with a cylindrical internal cavity. The tensile load of the cable is transmitted to this type of anchor via support flange 26. Free portion 22 extends below support flange 26. FIG. 5 shows the formation of a free portion 22 on an anchor 12 which is purely cylindrical. This type of anchor must be threaded onto, pressed into, or otherwise bonded to rigid portion 24 of the potted termination.

Figure 6:
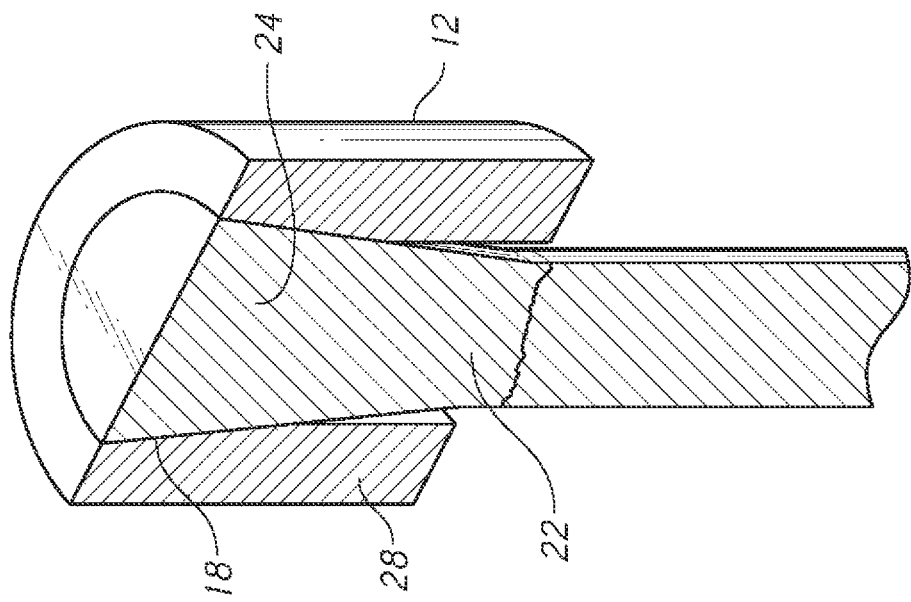
FIG. 6 is a sectional perspective view, showing an embodiment of the present invention.

In some instances it may be desirable to protect the free portion, or possibly limit its range of lateral motion. FIG. 6 shows a suitable anchor 12 incorporating enlarged diameter 28. Free portion 22 is able to flex and elongate—although its conical shape makes it stiffer than the free portion 22 shown in FIG. 4.

Figure 7:
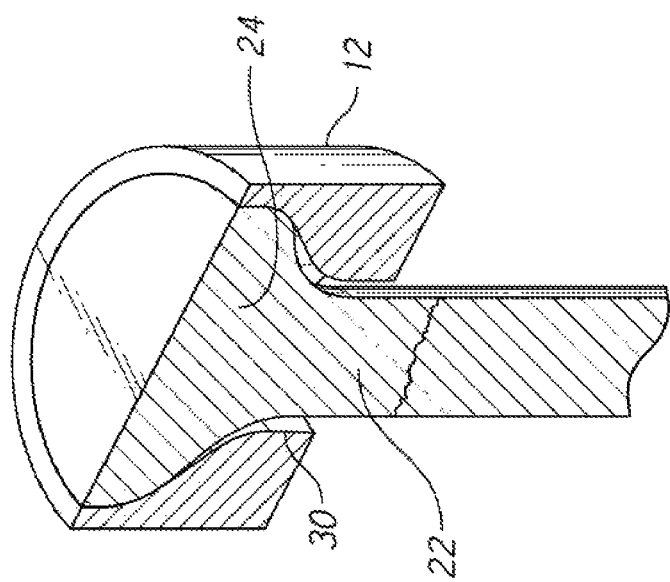
FIG. 7 is a sectional perspective view, showing an embodiment of the present invention.
Figure 7B:
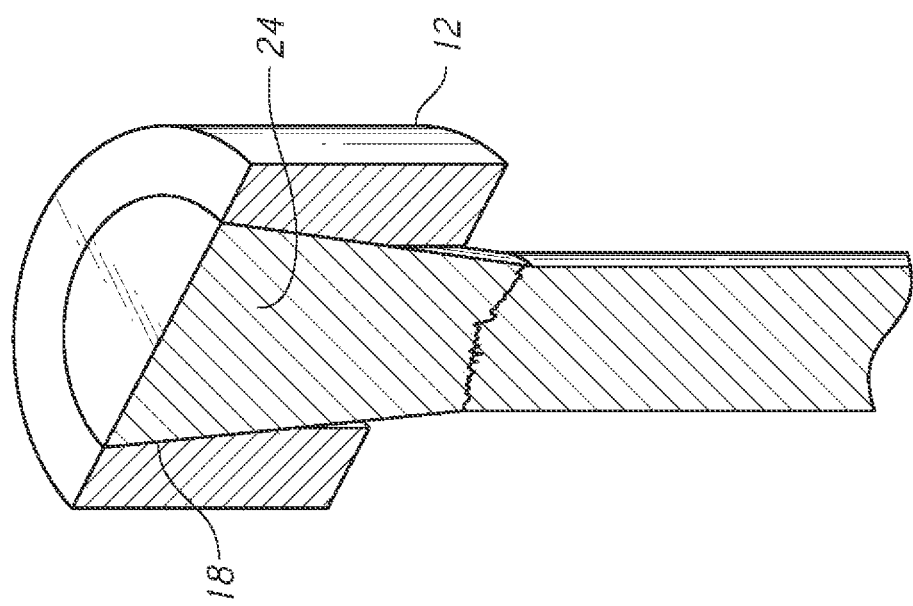
FIG. 7B is a sectional perspective view, showing an embodiment of the present invention.

In some cases it may be desirable to eliminate the presence of sharp corners within anchor 12, especially where filament pinching is a concern. The presence of sharp corners may also cause fractures in the potting compound itself. FIG. 7 shows an anchor 12 having curved passage 30. The potted region is again divided into rigid portion 24 and free portion 22. However, the use of the curved surfaces eliminates any sharp delineation between the rigid and free portions. FIG. 7B shows a simpler geometry which also eliminates the presence of sharp corners.

Figure 8:
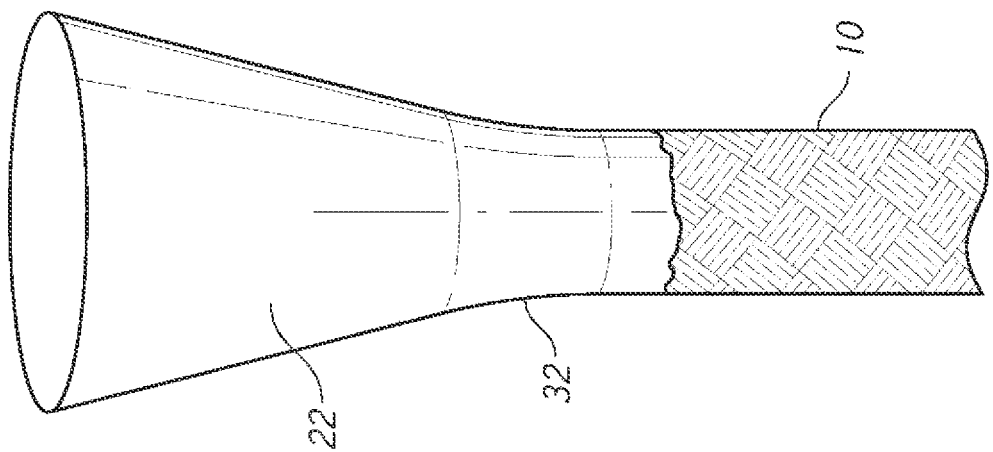
FIG. 8 is a sectional perspective view, showing an embodiment of the present invention.
Figure 9:
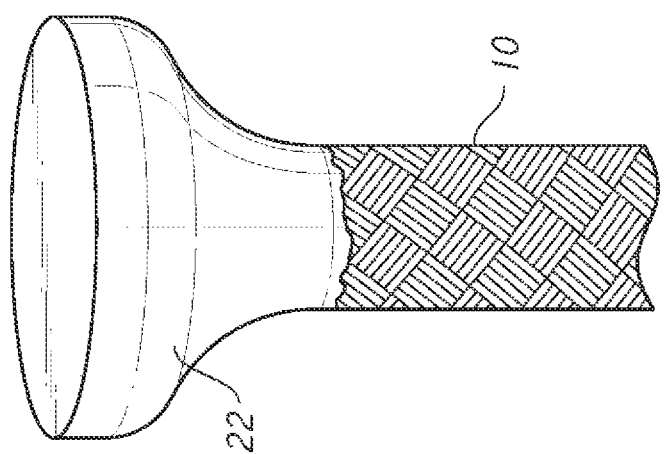
FIG. 9 is a sectional perspective view, showing an embodiment of the present invention.

The shape of free portion 22 can be altered to alter its mechanical properties. FIG. 8 shows an enlargement of the joint between free portion 22 and cable 10 (The upper rigid portion of the solidified potted region is not shown in this view). The addition of fillet 32 in the shape of the potted filaments can help eliminate stress concentrations. FIG. 9 shows a version of free portion 22 having two intersecting curves. Those skilled in the art will realize that this shape will produce rapidly increasing stiffness as one proceeds up free portion 22. The transition could take many different shapes—depending on the mechanical properties desired.

Figure 10:
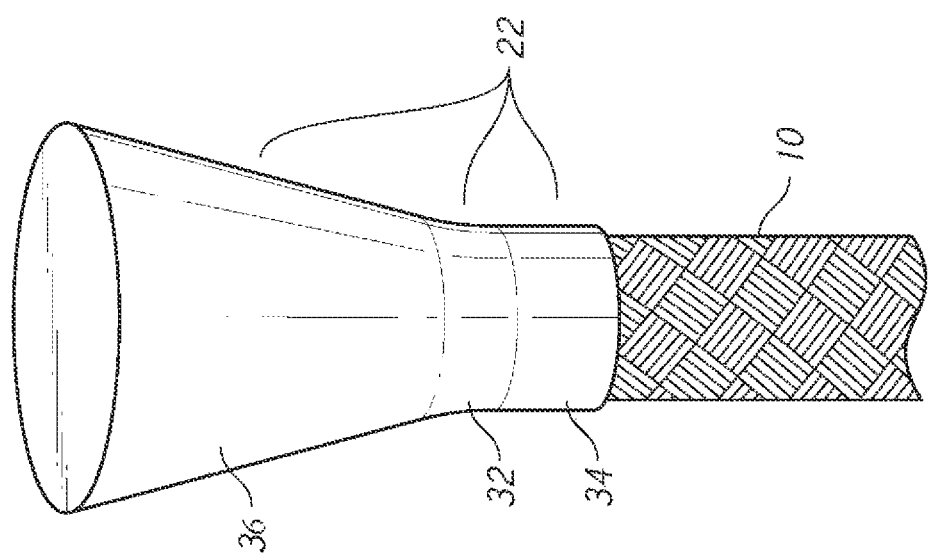
FIG. 10 is a sectional perspective view, showing an embodiment of the present invention.

Free portion 22 can also contain a straight portion over dome distance of the cable. FIG. 10 shows a free portion 22 having expanding component 36 joined to straight component 34 by fillet 32 (The upper rigid portion of the solidified potting compound is not shown). This configuration serves to limit the flexibility of cable 10 for extended distances away from the anchor. It also allows controlled elongation along the cable's axis. As one example, a straight portion will elongate more consistently that a conical taper.

Figure 11:
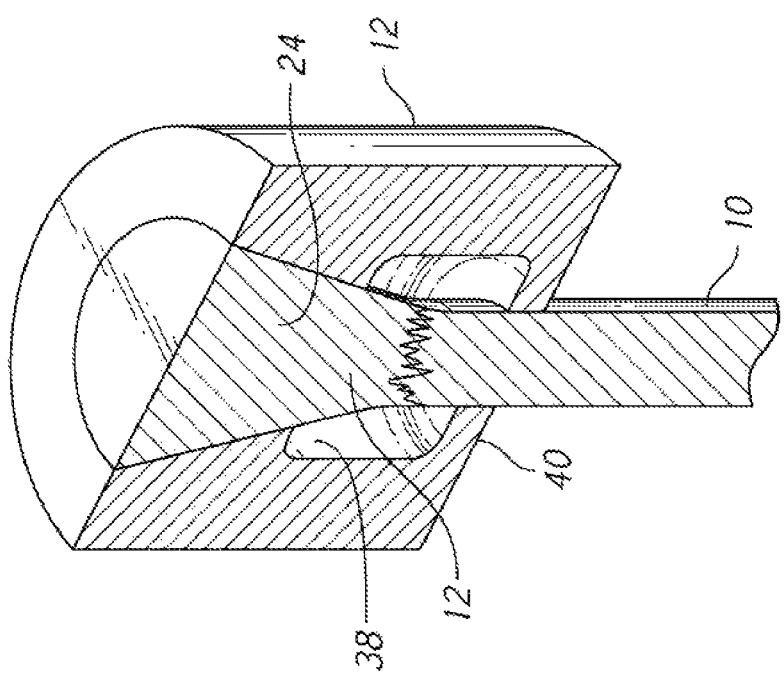
FIG. 11 is a sectional perspective view, showing an embodiment of the present invention.

FIG. 11 shows an anchor configured to allow a transition, but restrict the lateral movement of free portion 22. This particular anchor 12 incorporates annular cavity 38, which allows some limited motion within free portion 22, the motion is restricted in the lateral direction, but limited axial elongation is allowed. Although a simple cylindrical cavity is illustrated, the shape of such an anchor could take many forms.

Figure 12:
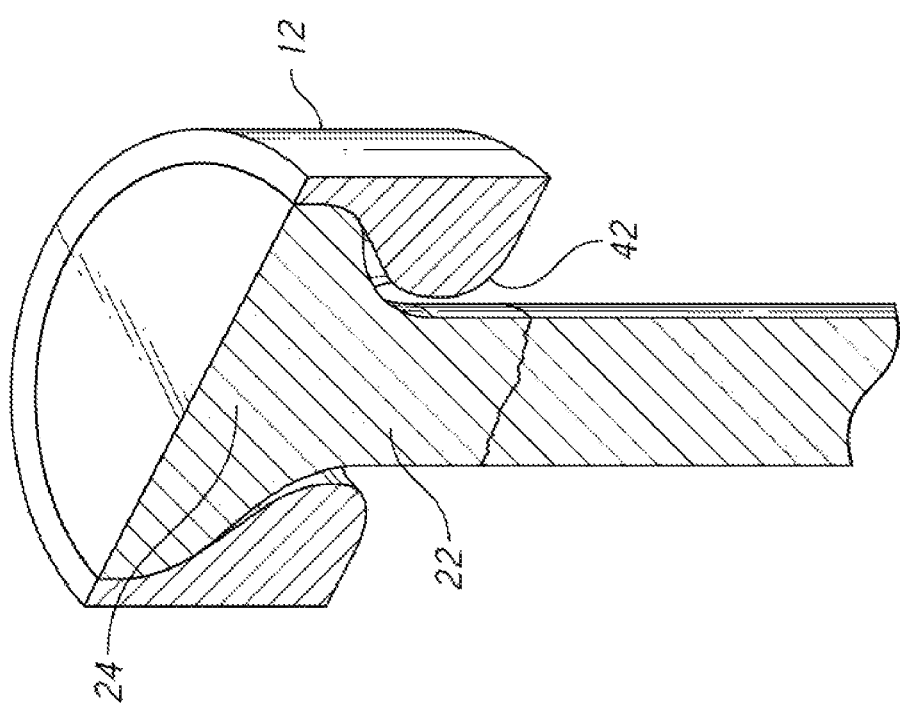
FIG. 12 is a sectional perspective view, showing an embodiment of the present invention.

FIG. 12 shows still another modified anchor 12. In this version, a large radius denoted as strain relief 42 is added to the lower opening of the internal passage. Strain relief 42 tends to limit and control the lateral motion of cable 12 without pinching and potentially breaking the cable filaments (or the potting resin). This configuration also reduces fatigue of the filaments and potting compound.

Many methods can be used to create free portion 22. As one example, the potted cable termination could be molded in a separable two-part mold. Devices for creating a pre-molded composite shape of filaments encased in solidified potting compound are disclosed in commonly-owned U.S. Pat. No. 6,957,485. U.S. Pat. No. 6,957,485 is hereby incorporated by reference. Of particular interest is FIG. 15 of that patent and its related textual descriptions. A mold can be provided to create a molded, hardened composite of filaments mid solidified potting compound on the end of a cable or strand. This composite can then be transferred to another anchor (such as by sliding an anchor down the cable before the molding process takes place and sliding the anchor back up and over the molded composite after the molded composite is removed from the mold).

Figure 13A:
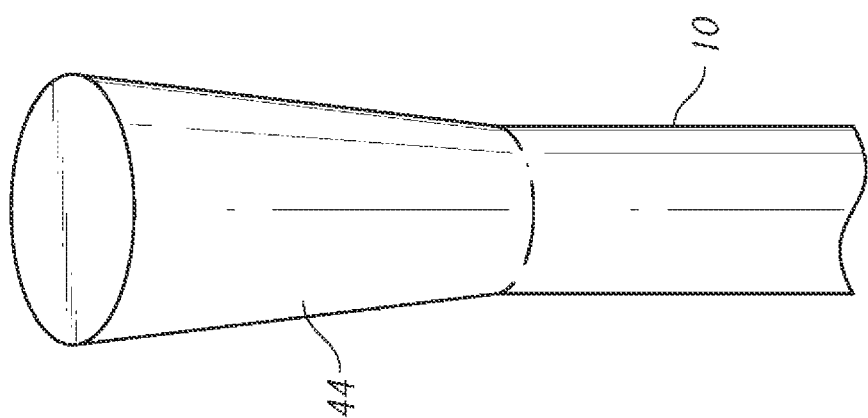
FIG. 13A is a sectional perspective view, showing an embodiment of the present invention.
Figure 13B:
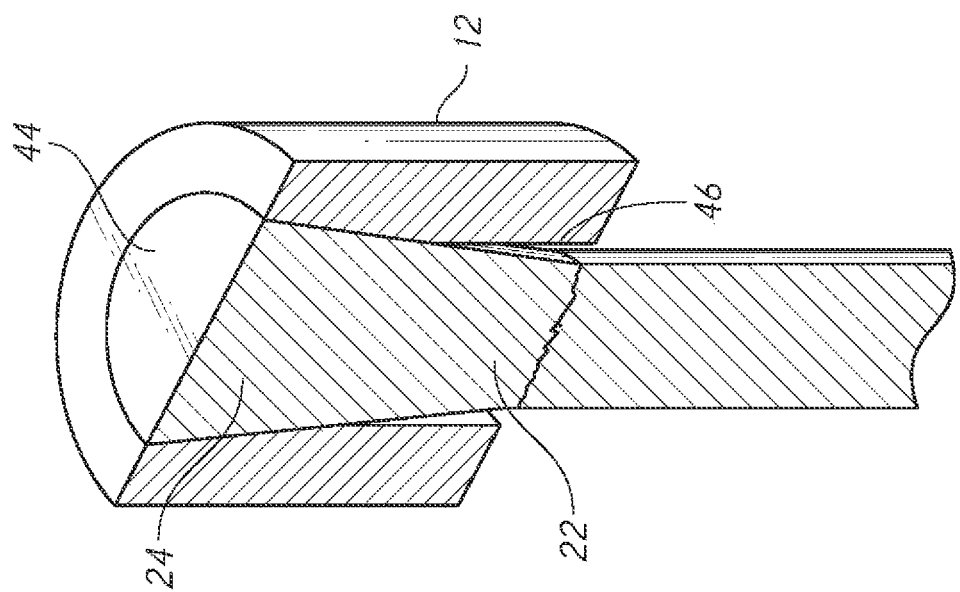
FIG. 13B is a sectional perspective view, showing an embodiment of the present invention.

FIG. 13A shows the result of such a molding operation. Pre-molded termination 44 consists of hardened potting compound surrounding the end filaments of cable 10. In FIG. 13B, an anchor is moved upward on cable 10 until it surrounds pre-molded termination 44. This particular anchor contains free bore 46, which is larger than the corresponding portion of pre-molded termination 44. The result is the creation of a rigid portion 24 and a free portion 22.

It is also possible to mold free portion 22 in situ. In FIG. 14, anchor 12 and molding supplement 48 are in position on one end of cable 10. Potting compound is poured into the open end of anchor 12 (or painted on or applied by other conventional means). Once the potting compound has hardened, molding supplement 48 is removed—as shown in FIG. 15. Free portion 22 then remains. A separate lateral motion restricting device can then be added, providing the function of motion inhibitor 40 shown in FIG. 11.

Figure 16:
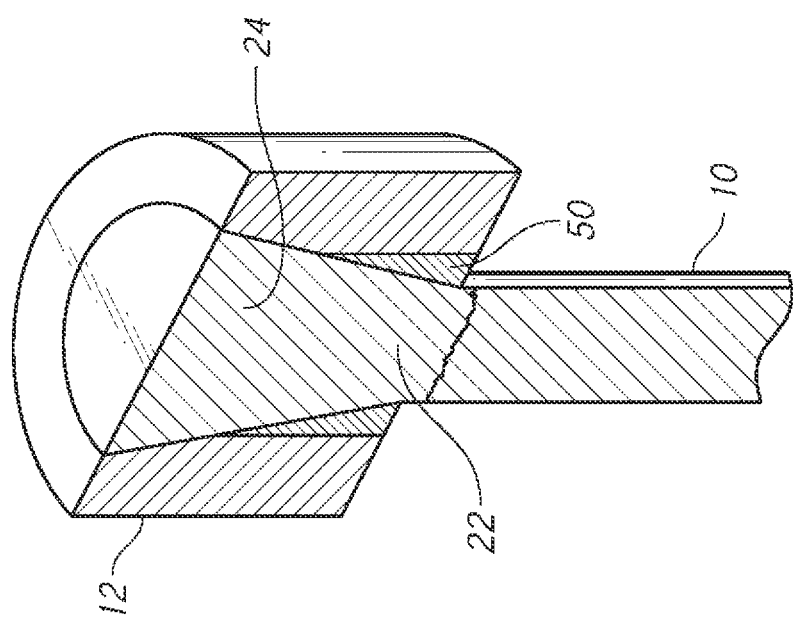
FIG. 16 is a sectional perspective view, showing an embodiment of the present invention.

The free portion can also be created by using an anchor comprised of different materials. In FIG. 16, anchor 12 has an annular portion comprised of removable material 50. The potting compound is poured into the anchor and allowed to harden. Removable material 50 is then removed by melting, chemical dissolving, vibrating (in the case of a "green sand" component) or other suitable means. A void results, creating free portion 22. In this embodiment shown, the void is formed near the lower extreme of anchor 12. However, the void could just as easily be formed in some other location.

Figure 17:
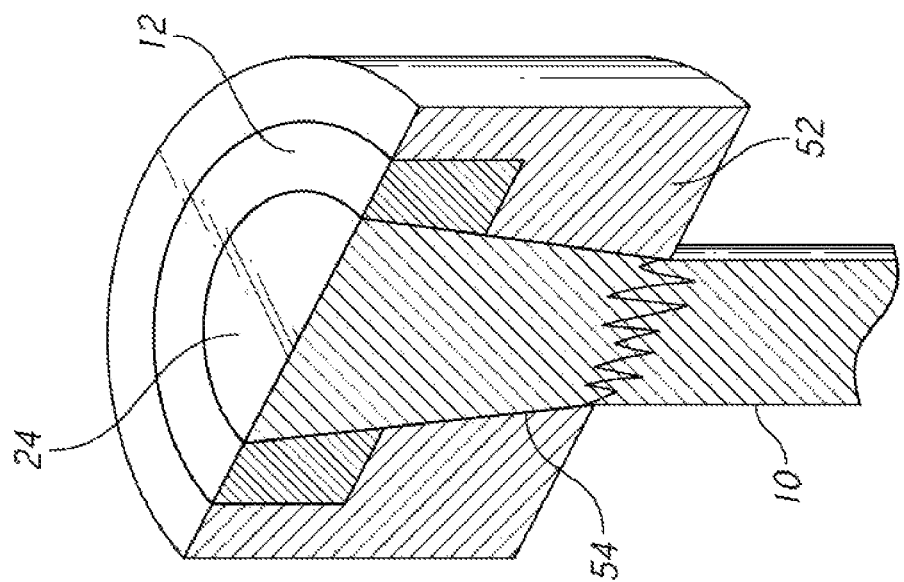
FIG. 17 is a sectional perspective view, showing an embodiment of the present invention.

The use of dissimilar materials within anchor 12 can also produce desirable properties in the finished termination as a whole. FIG. 17 shows anchor 12, which is made of a rigid material such as aluminum or steel. Soft collar 52, made of a pliable material such as rubber, is bonded to anchor 12. Soft collar 52 includes cable cushion 54, which cushions lateral motion of cable 10. Soft collar 52 also serves as the lower portion of a mold used to create rigid portion 24. It is simply left in place following the hardening of the potting compound. Since it is made of soft, pliable material, it does not restrict the flexure and elongation of the neck of hardened potting compound it contains.

Other combinations of materials are possible. It may be advantageous in certain circumstances to use a hard but slick material as a substitute for soft collar 52. When a cable is loaded in tension, rigid portion 24 is not entirely static. It does shift up and down somewhat; it also undergoes axial elongation. The use of a slick material as a substitute for soft collar 52 can produce desirable properties, in that it can allow cyclic axial elongation without surface abrasion.

The preceding embodiments have illustrated the application of a single anchor to an end of a unitary cable. The present invention has application to many other types of termination. As those skilled in the art will know, many cable include at least one level of sub-grouping of the filaments comprising the cable (many additional layers are known as well).

Figure 18:
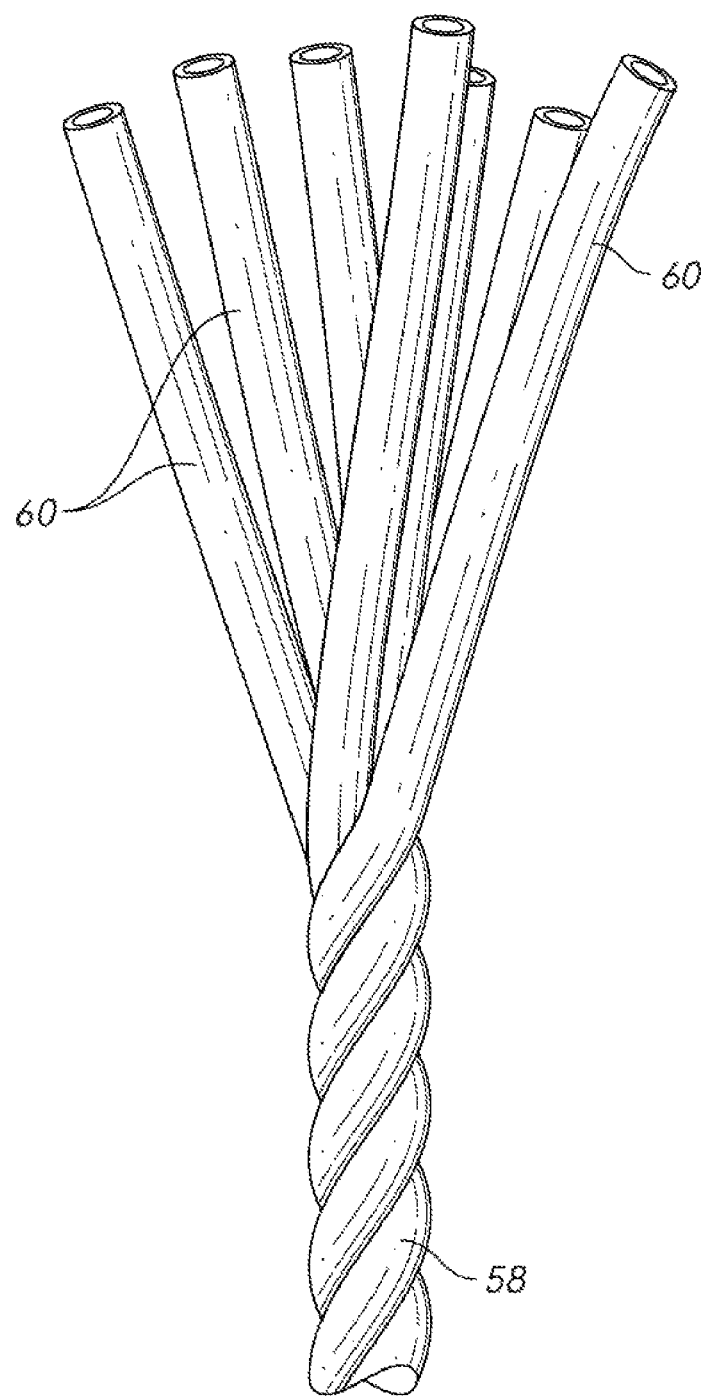
FIG. 18 is a perspective view, showing a cable made using several strands twisted together.

FIG. 18 depicts a cable 58 in which seven individual strands 60 are twisted together to form a helix. This is a very simple construction, as many multi-stranded cables involve a braided pattern of strands. For the example of FIG. 18, the strands near the end of the cable have been unwound to provide access to the end of each strand. An anchor can be attached to the end of each strand and the anchors can then be gathered together by attaching them to a separate collector.

Figure 19:
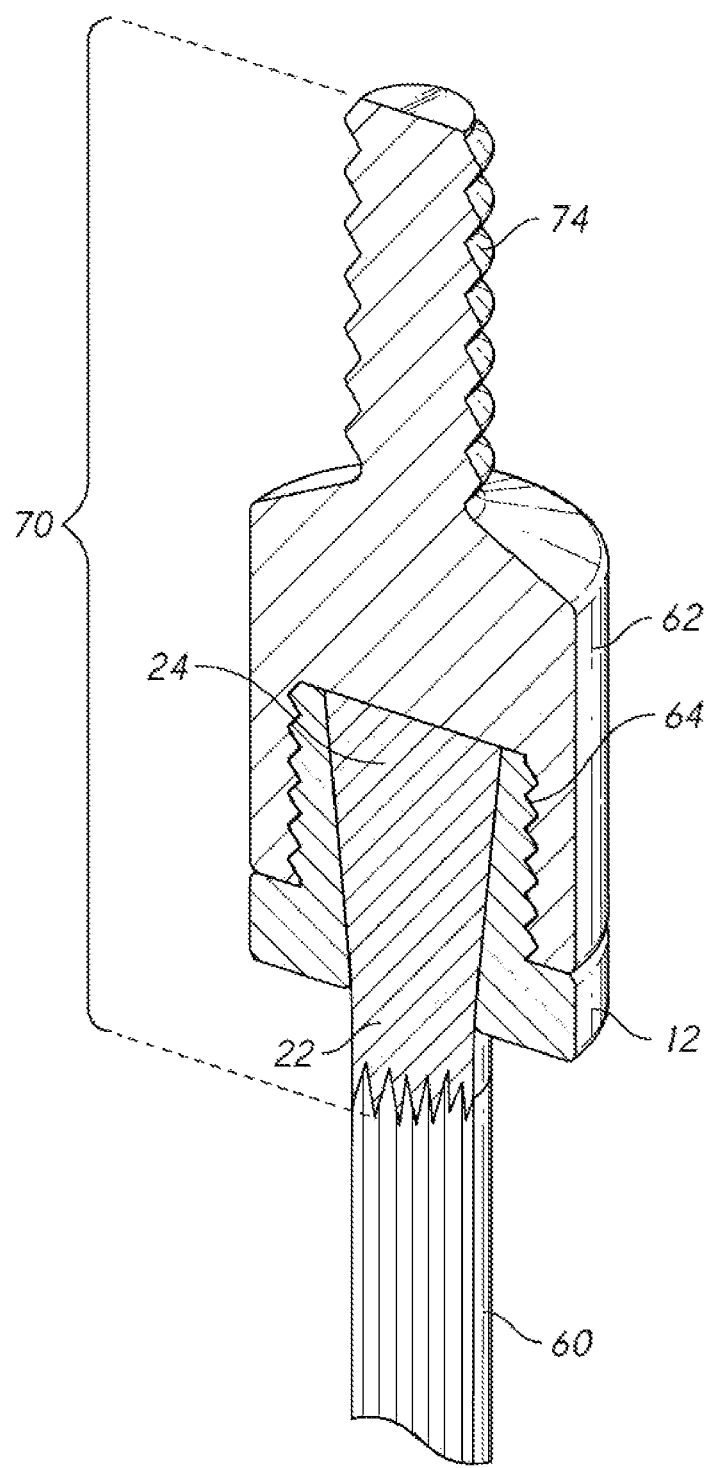
FIG. 19 is a sectional perspective view, showing an exemplary strand termination made according to the present invention.

FIG. 19 shows an exemplary strand termination 70 incorporating the present invention. Anchor 12 incorporates a potted section with a rigid portion 24 and a free portion 22 extending out of the anchor's throat region. Strand 60 is potted into the anchor as shown. Coupler 62 is provided to link the anchor to a separate collector. Threaded engagement 64 is provided between the anchor and the coupler. Stud 74 extends from coupler 62.

Figure 20:
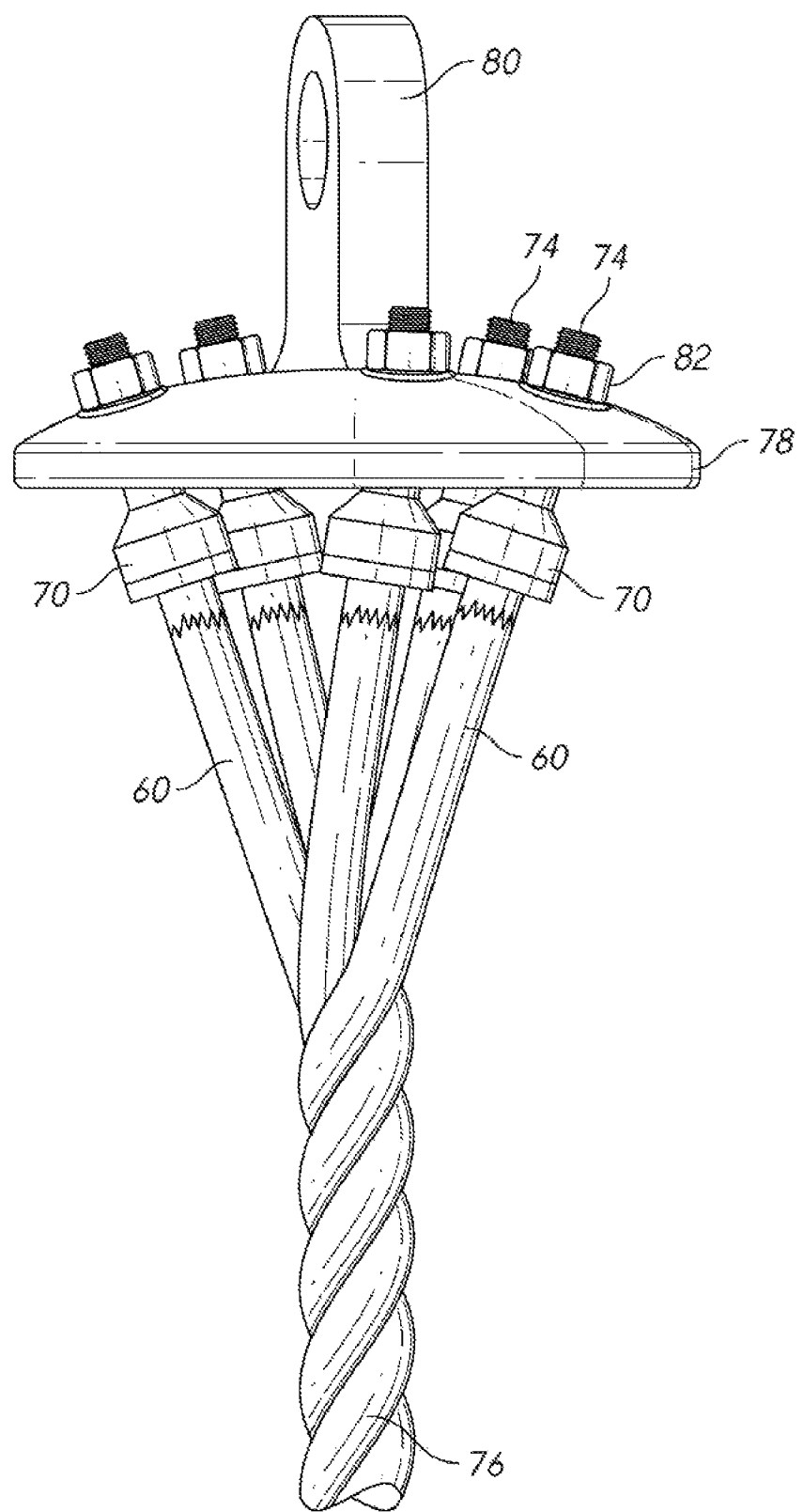
FIG. 20 is an elevation view, showing multiple strand terminations connected to a single collector.

FIG. 20 shows a completed assembly in which a strand termination 70 has been added to each strand 60. The stud 74 on each strand termination has been passed through a hole in collector 78 and a nut 82 has been threaded onto each stud 74 in order to attach the strand terminations to the collector. Loading eye 80 is provided on collector 78 so that the completed assembly can be connected to an external component.

Figure 21:
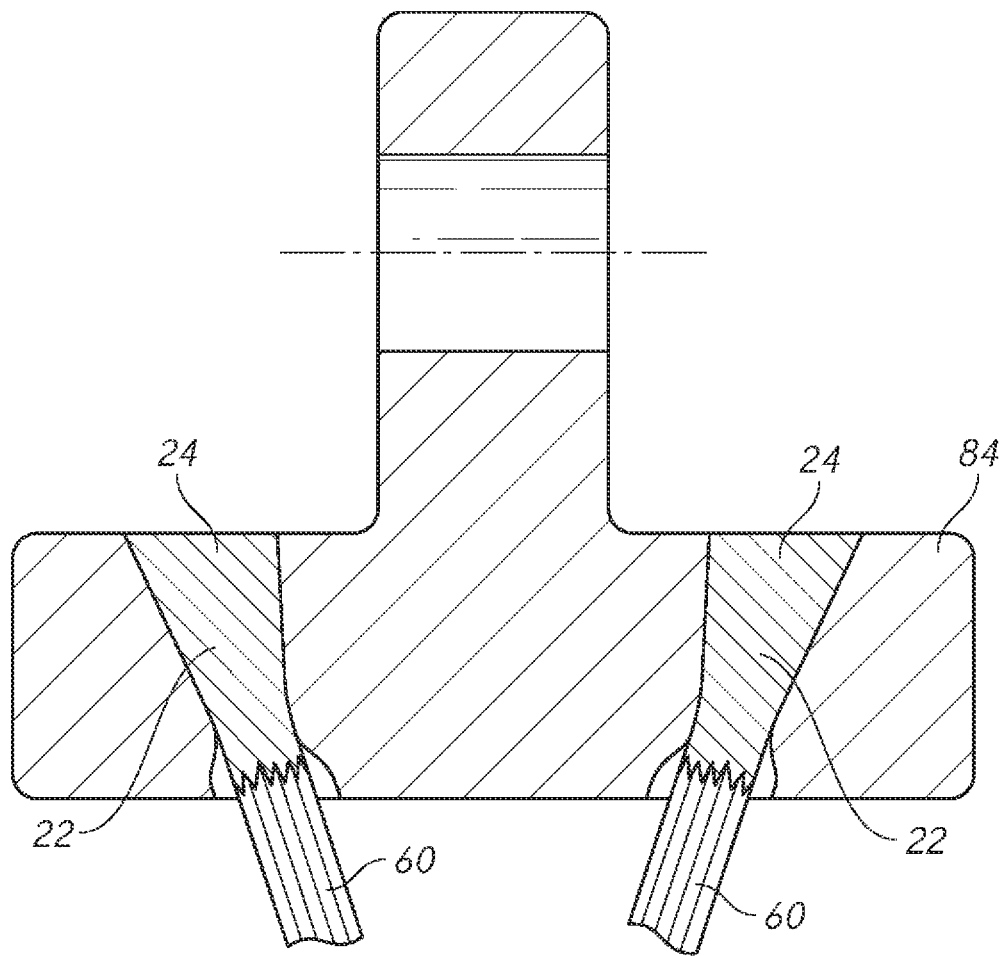
FIG. 21 is a sectional elevation view, showing a multiple cavity anchor that utilizes the present invention.

The present invention can also be applied to a unitary anchor that contains multiple separate potting cavities. FIG. 21 illustrated such a multiple cavity anchor 84. Each cavity includes an expanding portion so that a free portion 22 is formed near the throat end of the potted region. A rigid portion 24 is likewise formed in each potting cavity. An individual strand 60 is potted into each of the cavities. Thus, the unitary anchor shown in FIG. 21 can take the place of the more complex assembly shown in FIG. 20 when dealing with multi-stranded cables. The approach of creating a free portion of the solidified potting compound can be used for any of these components.

The present invention can be combined with many other inventions described in commonly, owned patents. These include:

1. Moldable cable termination systems such as described in commonly-owned U.S. Pat. No. 6,957,485. U.S. Pat. No. 6,957,485 is hereby incorporated by reference. Of particular interest is FIG. 15 of that patent and its related textual descriptions. A mold can be provided to create a molded, hardened composite of filaments and solidified potting compound on the end of a cable or strand. This composite can then be transferred to another anchor (such as by sliding an anchor down the cable before the molding process takes place and sliding the anchor back up and over the molded composite after the molded composite is removed from the mold). The mold in this case can be provided with a suitable profile to accommodate the formation of a free portion in the solidified potting compound.

2. Resin infusion potting systems such as described in commonly-owned U.S. Pat. Nos. 8,048,357 and 8,236,219. Both these patents are hereby incorporated by reference. The cavity in the anchors disclosed in these patent can be provided with a suitable relief to accommodate the free portion of the solidified potting compound.

3. Translation-based termination optimization systems such as disclosed in U.S. Pat. No. 9,840,044 and pending U.S. application Ser. No. 15/838,457. Both these documents are hereby incorporated by reference. The anchor cavities disclosed in these patent documents can be provided with a suitable relief to accommodate the free portion of the solidified potting compound.

4. In all cases where a portion of the potted region extends out the neck region of the anchor it is advisable to provide a shrouding or guiding piece to prevent excessive lateral flexure of this region. As a first example, free portion 22 in FIG. 19 is preferably surrounded by a motion inhibitor such as shown in FIG. 11. As a second example, in FIG. 20 a tapered shroud could be put in place to surround all the exposed terminations and strands as they leave the vicinity of collector 78.

Although the preceding description contains significant detail, it should not be construed as limiting the scope of the invention but rather as providing illustrations of the preferred embodiments of the invention.

I claim:

1. A method for affixing a termination to an end of a tensile strength member including synthetic filaments, comprising:
    (a) providing an anchor, having an expanding passage bounded by a passage wall;
    (b) providing a molding supplement with an internal passage;
    (c) placing said molding supplement adjacent to said anchor with said internal passage of said molding supplement being aligned with said expanding passage in said anchor;
    (d) placing a length of said synthetic filaments within said expanding passage in said anchor and said internal passage within said molding supplement;
    (e) adding a liquid potting compound to said length of synthetic filaments;
    (f) allowing said liquid potting compound to transition into a solid; and
    (g) removing said molding supplement, thereby creating a rigid portion of solidified potting compound within said anchor and a free portion of said solidified potting compound extending out of said anchor.

2. The method for affixing a termination as recited in claim 1, wherein:
    (a) said rigid portion of said solidified potting compound is in contact with said passage wall; and
    (b) said free portion of said solidified potting compound is not in contact with said passage wall.

3. The method for affixing a termination as recited in claim 2, wherein said free portion includes an expanding component and a straight component.

4. The method for affixing a termination as recited in claim 3, wherein said free portion includes a fillet between said expanding component and said straight component.

5. The method for affixing a termination as recited in claim 2, further comprising adding a motion inhibitor contacting said tensile strength member proximate said free portion.

6. The method for affixing a termination as recited in claim 5 wherein said anchor includes an annular cavity proximate said free portion.

7. The method for affixing a termination as recited in claim 2, wherein said passage wall is defined by a profile revolved around a central axis.

8. The method for affixing a termination as recited in claim 1 wherein said termination is attached to a collector.

9. The method for affixing a termination as recited in claim 1 wherein said anchor has multiple expanding cavities, with each of said expanding cavities being configured to receive a length of said synthetic filaments.

10. The method for affixing a termination as recited in claim 1, wherein said passage wall is defined by a profile revolved around a central axis.

11. A method for affixing a termination to an end of a tensile strength member including synthetic filaments, comprising:
    (a) providing an anchor, having an expanding passage defined by a wall profile revolved about a central axis;
    (b) providing a molding supplement with an internal passage running therethrough;
    (c) placing said molding supplement against said anchor with said internal passage of said molding supplement being aligned with said expanding passage in said anchor;
    (d) placing a length of said synthetic filaments within said expanding passage in said anchor and said internal passage within said molding supplement;
    (e) adding a liquid potting compound to said length of synthetic filaments;

(f) allowing said liquid potting compound to transition into a solid; and (g) removing said molding supplement, thereby creating a rigid portion of solidified potting compound within said anchor and a free portion of said solidified potting compound extending out of said anchor.

12. The method for affixing a termination as recited in claim 11, wherein:

(a) said rigid portion of said solidified potting compound is in contact with said passage wall; and (b) said free portion of said solidified potting compound is not in contact with said passage wall.

13. The method for affixing a termination as recited in claim 12, wherein said free portion includes an expanding component and a straight component.

14. The method for affixing a termination as recited in claim 13, wherein said free portion includes a fillet between said expanding component and said straight component.

15. The method for affixing a termination as recited in claim 12, further comprising adding a motion inhibitor contacting said tensile strength member proximate said free portion.

16. The method for affixing a termination as recited in claim 15 wherein said anchor includes an annular cavity proximate said free portion.

17. The method for affixing a termination as recited in claim 12, wherein said passage wall is defined by a profile revolved around a central axis.

18. The method for affixing a termination as recited in claim 11 wherein said termination is attached to a collector.

19. The method for affixing a termination as recited in claim 11 wherein said anchor has multiple expanding cavities, with each of said expanding cavities being configured to receive a length of said synthetic filaments.

20. The method for affixing a termination as recited in claim 11, wherein said passage wall is defined by a profile revolved around a central axis.

\* \* \* \* \*